April 19, 1960   G. E. KEEFER   2,933,545
OXIDATION SHIELD FOR ELECTRIC FURNACE ELECTRODES
Filed March 29, 1956
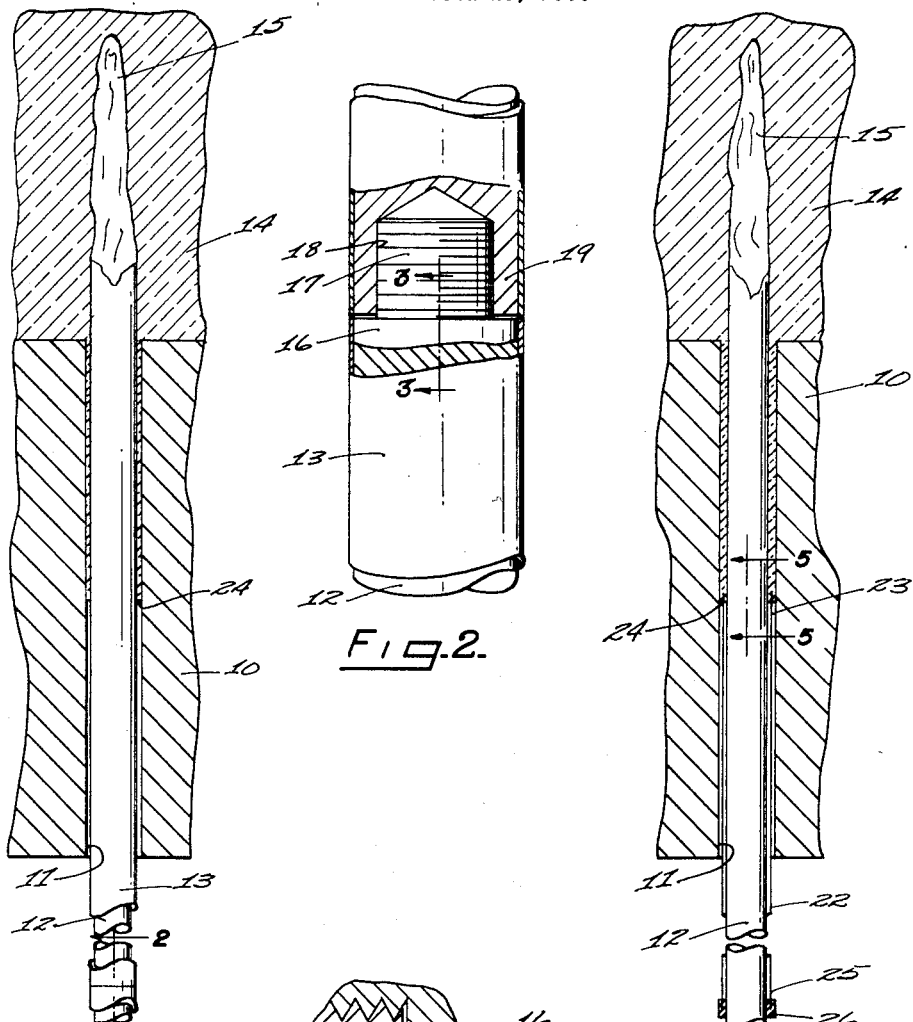
INVENTOR.
GEORGE E. KEEFER
BY W. A. Schaich
Leonard D. Soubier
ATTORNEYS

United States Patent Office

2,933,545
Patented Apr. 19, 1960

2,933,545

OXIDATION SHIELD FOR ELECTRIC FURNACE ELECTRODES

George E. Keefer, Toledo, Ohio, assignor to Owens-Illinois Glass Company, a corporation of Ohio Application March 29, 1956, Serial No. 574,792

8 Claims. (Cl. 13—17)

In the manufacture of commercial glass products from vitrescent raw materials, it has been found to be particularly advantageous in many instances to either supplement or completely replace conventional combustion-type melting methods with electric melting techniques. These electric melting techniques employ resistance, or Joule effect, heating principles by utilizing the electrically conductive properties of glass when in a heat-softened condition. In present-day commercial glass manufacture it has become common practice to carry out this Joule effect heating technique through utilization of electrodes, generally composed of materials such as graphite, carbon, or molybdenum, which transmit electric current to a mass of heat-softened glass-forming material contained within the melting furnace. However, it has been found that these electrodes are readily subject to excessive thermal oxidation and consequent deterioration resulting from the elevated temperatures encountered in the melting operation.

Therefore, it is a principal object of the present invention to provide an improved oxidation shield for electrodes which will substantially prevent thermal oxidation of electrodes used in melting glass-forming materials.

Another object of this invention is to provide an oxidation shield for electrodes characterized by its simplicity of design, ease of installation, and inexpensive maintenance costs.

A further object of this invention is the provision of an oxidation shield which will permit rapid adjustment replacement of electrodes once they have been installed in their operative positions.

The specific nature of this invention, as well as other objects and advantages thereof, will become apparent to those skilled in the art from the following detailed description, taken in conjunction with the annexed sheet of drawings in which, by way of preferred example only, are illustrated the preferred embodiments of this invention.

Fig. 1 is a fragmentary sectional plan view of a glass melting furnace wall taken at a location somewhat below the molten glass level, and showing the relative operating position of an electrode shielded from thermal oxidation in accordance with the present invention.

Fig. 2 is an enlarged scale fragmentary sectional view taken substantially along the line 2—2 in Fig. 1, showing a construction for joining identical electrode sections in successive endwise relative engagement to form a multiple section electrode.

Fig. 3 is an enlarged scale fragmentary sectional view taken substantially along the line 3—3 in Fig. 2.

Fig. 4 is a view similar to Fig. 1 showing an alternate embodiment of the present invention.

Fig. 5 is an enlarged scale fragmentary sectional view taken substantially along the line 5—5 in Fig. 4.

With reference to Fig. 1, there is illustrated an electrode section 12 of the type commonly employed in Joule effect, or resistance type, electric melting of glass-forming materials. In accordance with this invention the electrode section 12 is protected from thermal oxidation by an annular thin walled casing, or oxidation shield 13, surrounding the electrode section 12 in press-fit relationship. Additionally, the encased electrode section 12 is illustrated in its operative position, traversing a melting furnace wall 10 through an aperture 11, and having a melt insertable portion 15 submerged within a quantity of molten vitrescent material, such as molten glass 14. The aperture 11 is of substantially larger diameter than the encased electrode section 12 to permit a regulated amount of molten glass 14 to flow into the aperture 11, and surround the casing 13, to form a gas impervious inner seal 24 between the aperture 11 and casing 13. The amount of molten glass 14 permitted to flow into the aperture 11 may be regulated by directing a stream of cooling air into the aperture 11 and against the molten glass 14, to thereby solidify the molten glass 14 at a predeterminable location within the aperture 11. Additionally, if the use of cooling air is undesirable, the aperture 11 may be diametrically reduced relative to the electrode section 12, to substantially restrict the flow of molten glass 14 to such an extent that it will solidify within the aperture 11 without the administration of any cooling air.

The materials from which glass melting furnace electrodes, such as the electrode section 12, are generally composed are graphite, carbon, or molybdenum. However, these materials as well as the casing material are subject to gradual erosion and deterioration when inserted into the molten glass 14 and, as a result, the melt insertable portion 15 of the encased electrode section 12 gradually becomes consumed by the molten glass 14, thereby necessitating occasional additional insertion of the electrode section 12 into the molten glass 14 to replace the consumed portion. To insert the electrode section 12 into the molten glass 14 the additional requisite amount, the solidified glass within the aperture 11 may be heat-softened, either by withdrawing the cooling-air directed into the aperture 11, or by supplying additional external heat to the solidified glass, or both, after which the electrode section 12 is substantially free to move and may be advanced into the molten glass 14 as required. Following each additional insertion of the electrode section 12, the molten glass 14 may be resolidified within the aperture 11, as previously described.

In order to obtain the maximum utilization and effectiveness of the electrode section 12, it is desirable that the entire electrode section 12 should be eventually utilized in the melting operation, and consequently be consumed by the molten glass 14. As illustrated in Fig. 2, provision is made for the complete utilization of an electrode section 12 by joining the end portions of identical electrode sections 12 together in such manner that they may be successively and sequentially advanced into the molten glass 14 as each electrode section 12 is consumed. As illustrated, the inner end portion 16 of the electrode section 12 has an integrally formed axial extension 17 which is diametrically smaller than the main body portion of the electrode section 12, and which may be threadably advanced into cooperable engagement with a cavity 18 threadably defined in the outer end portion 19 of an identical electrode section 12. This endwise engagement of identical electrode sections 12 may be repeated in unending succession to form a multiple section electrode capable of endless sequential insertion into the molten glass 14 as the electrode sections 12 are gradually consumed.

Additionally, as best illustrated in Fig. 3, the annular casing 13 surrounding each electrode section 12 has bevelled edges 20 and 21 adjacent to the opposite ends 16 and 19, respectively of the electrode section 12. Each of the oppositely disposed bevelled edges 20 and 21 is complementary to the other and engages the bevelled casing edges 20 and 21 on identical electrode sections 12 in wedge-fit relationship, when the electrode sections 12 are secured in adjacent endwise threaded engagement. The wedge-fit so formed between the adjacent casing edges 20 and 21 provides a gas impervious outer seal which effectively protects the engaged end portions of the adjacent electrode sections 12 from thermal oxidation as they are sequentially advanced into the elevated temperature regions of the melting furnace. Additionally, the outer seal, so provided, cooperates with the inner seal 24 to substantially isolate the entire electrode section 12 from oxidizing furnace gases and air.

As illustrated in Fig. 4, an alternate embodiment of this invention comprises a loose-fitting annular casing 22, or oxidation shield, which is positionable in surrounding relationship with the electrode section 12, and which has an inner end portion 23 extending into the aperture 11 and embedded in the molten glass 14 flowing into the opposite end of the aperture 11. As best illustrated in Fig. 5, the molten glass 14 within the aperture 11 then is solidified around the inner end portion 23 of the casing 22 and electrode section 12, to form a gas impervious inner seal 24. The solidification of the molten glass 14 may be carried out in substantially the same manner as hereinbefore described with respect to the press-fit casing 13. At the outer end portion 25 of the casing 22, and located exteriorly of the aperture 11, there is an outer seal 26 joining the outer end portion 25 of the casing 22 with the electrode section 12 in gas impervious sealed relationship. This outer seal 26 may be composed of any suitable bonding material, such as rubber, capable of withstanding the elevated temperatures present about the exterior of the melting furnace wall 10. Preferably the properties of the bonding material should permit release of the electrode section 12, to permit occasional axial insertion thereof into the molten glass 14. However, in some circumstances it may be preferable to employ a suitable mechanical seal having these characteristics, rather than a bonding material, and it is therefore not intended to limit this invention to a particular type of outer seal 26.

As distinguished from the press-fit casing 13, the loose-fit casing 22 may be maintained in a fixed position while the electrode section 12 is advanced into the molten glass 14. And, after insertion of each electrode section 12, the molten glass 14 is resolidified within the aperture, and the outer seal 26 resealed to the electrode section, as before.

A principal advantage of the present invention in all of its embodiments resides in the economical advantage obtained, by effectively preventing deleterious thermal oxidation of glass melting furnace electrodes through the utilization of a structure characterized by inexpensive installation and maintenance costs.

Another advantage of this invention resides in its adaptiveness to glass melting furnace electrodes presently utilized in the commercial production of glass products.

Other relative advantages of the present invention are readily apparent when contrasted with other competing types of oxidation shields employing a fluid cooled hollow sleeve surrounding the electrode. The present invention, as herein described, eliminates the necessity of a fluid cooling system in conjunction with the oxidation shield, and also eliminates the possibility of fluid leakage entering the molten glass, resulting in a seedy glass and a consequent unacceptable glass product.

It will, of course, be understood that various details of construction may be modified through a wide range without departing from the principles of this invention, and it is, therefore, not the purpose to limit the patent granted hereon otherwise than necessitated by the scope of the appended claims.

I claim:
1. In an electric furnace for melting and retaining a molten vitrescent material and having portions defining an aperture establishing communication between the interior of the furnace below the level of the molten material and the exterior ambient atmosphere, the improvement of a composite electrode structure including concentric interior electrode and exterior casing elements insertable into said aperture, said electrode element being formed of material susceptible to oxidation by contact with the ambient atmosphere at elevated temperatures and extending concentrically through said aperture into the molten material for consumption therein, said casing element being imperforate and surrounding at least a major portion of the axial extent of said electrode, said casing element projecting into said aperture to be sealed therein by solidified vitrescent material, said casing surrounding and sealingly engaging the exterior surfaces of the electrode element to be interposed between said electrode and the ambient atmosphere, thereby protecting from oxidation all portions of the electrode exterior to vitrescent material and subject to elevated temperatures at which the electrode is susceptible to oxidation.

2. The improvement as defined in claim 1, wherein said exterior casing element is press-fitted onto said electrode element and said casing is sufficiently smaller than said aperture to accommodate the entry and solidification of molten glass therebetween.

3. The improvement as defined in claim 1, wherein said exterior casing element is press-fitted onto said electrode element to be coextensive therewith, and said casing is sufficiently smaller than said aperture to accommodate the entry and solidification of molten glass therebetween, and a plurality of said composite electrode structures are secured together in end-to-end relation with the casings of said structures in abutment to define a continuous protective covering.

4. In a glass melting furnace containing a quantity of molten vitrescent material and having a furnace aperture communicating with said molten material, a thermally oxidizable electrode insertable through said aperture and being sufficiently smaller than said aperture to permit a predeterminable amount of said molten material to flow into said aperture in surrounding relationship to said electrode and to solidify within said aperture, the improvement comprising an imperforate annular casing within said aperture in loosely surrounding relationship to said electrode, said casing having an inner end portion insertable within said molten material and an outer end portion located exteriorly of said aperture, and gas impervious sealing means uniting said outer end portion to said electrode to substantially isolate the casing surrounded portion of said electrode from oxidizing gases.

5. The improvement defined in claim 4, wherein said electrode is axially slidable relative to said casing and wherein said gas impervious sealing means comprises an annular mass of bonding material slidably surrounding said electrode and securely engaging said casing outer end portion to permit longitudinal movement of said electrode relative to said casing while concurrently maintaining a gas impervious sealed relationship between said casing and said electrode.

6. In a glass melting furnace containing a quantity of molten vitrescent material and having a furnace aperture communicating with said molten material, a thermally oxidizable electrode insertable through said aperture and being sufficiently smaller than said aperture to permit a predeterminable amount of said molten material to flow into said aperture in surrounding relationship to said electrode and to solidify within said aperture, the improvement comprising an imperforate annular casing in loosely surrounding relationship to said electrode, said casing having an inner end portion insertable within said aperture and into said molten material to form a gas impervious inner seal and having an outer end portion positioned exteriorly of said aperture, and gas impervious sealing means for sealing said casing outer end portion to said electrode to substantially isolate the casing surrounded portion of said electrode from oxidizing gases.

7. The improvement defined in claim 6, wherein said gas impervious sealing means comprises an annular mass of bonding material slidably surrounding said electrode and securely engaging said casing outer end portion to permit longitudinal movement of said electrode relative to said casing while concurrently maintaining a gas impervious sealed relationship between said casing and said electrode.

8. In a glass melting furnace containing a quantity of molten vitrescent material and having a furnace aperture communicating with said molten material, a thermally oxidizable electrode insertable through said aperture into said molten material, the improvement comprising an imperforate annular casing within said aperture in loosely surrounding relationship to said electrode, said casing having an inner end portion insertable within said molten material and an outer end portion located exteriorly of said aperture and receiving said electrode in gas impervious sealed relationship to thereby substantially isolate the casing surrounded portion of said electrode from oxidizing gases.

References Cited in the file of this patent

UNITED STATES PATENTS

| | | |
|---|---|---|
| 1,314,603 | Mott | Sept. 2, 1919 |
| 1,542,716 | Payne | June 16, 1925 |
| 2,122,469 | Hitner | July 5, 1938 |
| 2,209,515 | Ehman et al. | July 30, 1940 |
| 2,526,241 | La Burthe et al. | Oct. 17, 1950 |
| 2,693,498 | Penberthy | Nov. 2, 1954 |
| 2,736,759 | Penberthy | Feb. 28, 1956 |
| 2,798,892 | Penberthy | July 9, 1957 |